(12) United States Patent
Englander

(10) Patent No.: US 6,398,376 B2
(45) Date of Patent: Jun. 4, 2002

(54) SIDE BREAK-AWAY REAR VIEW MIRROR ASSEMBLY WITH TELESCOPIC SUPPORT BRACE

(75) Inventor: Benjamin Englander, Jamaica, NY (US)

(73) Assignee: Rosco Inc., NY (US)

( * ) Notice: Subject to any disclaimer, the term of this patent is extended or adjusted under 35 U.S.C. 154(b) by 0 days.

(21) Appl. No.: 09/760,591

(22) Filed: Jan. 16, 2001

Related U.S. Application Data

(63) Continuation of application No. 08/989,800, filed on Dec. 12, 1997, now Pat. No. 6,059,419, which is a continuation-in-part of application No. 08/799,251, filed on Feb. 14, 1997, now Pat. No. 5,889,627, which is a continuation-in-part of application No. 08/711,810, filed on Sep. 10, 1996, now abandoned.
(60) Provisional application No. 60/176,240, filed on Jan. 14, 2000, and provisional application No. 60/009,784, filed on Jan. 16, 1996.

(51) Int. Cl.$^7$ ................................................ G02B 5/10
(52) U.S. Cl. ..................... 359/864; 359/865; 359/871; 359/872
(58) Field of Search .................................. 359/864, 865, 359/871, 872, 873, 876, 877

(56) References Cited

U.S. PATENT DOCUMENTS

| 4,961,638 | A | * | 10/1990 | D'Aquaro et al. | ............ 359/872 |
| 5,044,739 | A | * | 9/1991 | Santo | ............ 359/864 |
| 5,073,019 | A | * | 12/1991 | Santo | ............ 359/872 |
| 5,189,561 | A | * | 2/1993 | Hong | ............ 359/843 |

* cited by examiner

Primary Examiner—Mohammad Sikder
(74) Attorney, Agent, or Firm—Ostrolenk, Faber, Gerb & Soffen, LLP

(57) ABSTRACT

One or more side-view mirror assemblies located in shell housings which are supported at a distance relative to a vehicle in a manner which allows the shell housings to swing relative to the support structure thereof, further includes a telescopic support brace whose principle function is to reduce and substantially eliminate vibration. The telescopic support brace has inner and outer tubes which slide relative to one another and which are releasably locked at a normal position, but which allow the mirror holding shell to swing outwardly or inwardly in the event of a collision with an object, thereby preventing permanent damage thereto.

14 Claims, 17 Drawing Sheets

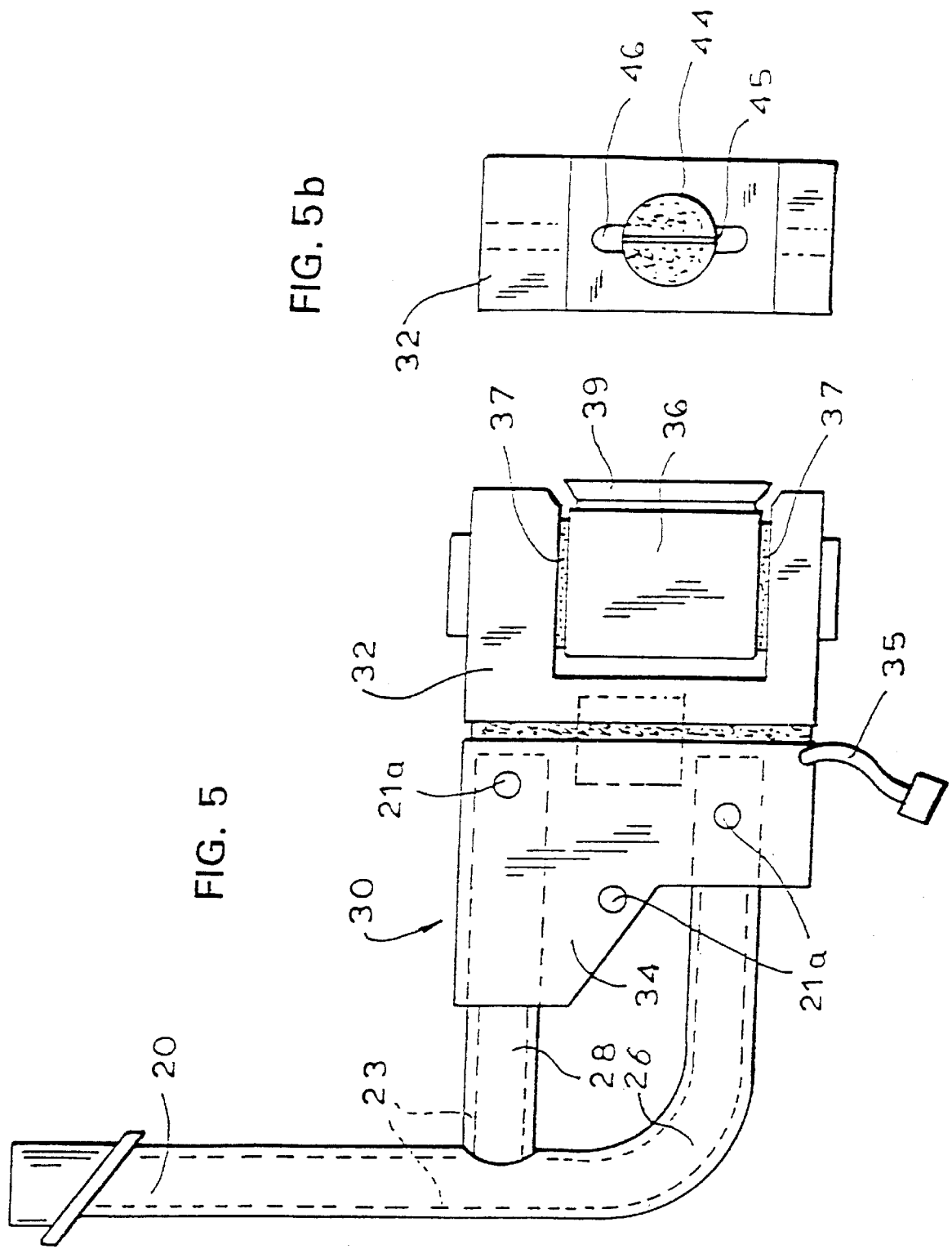

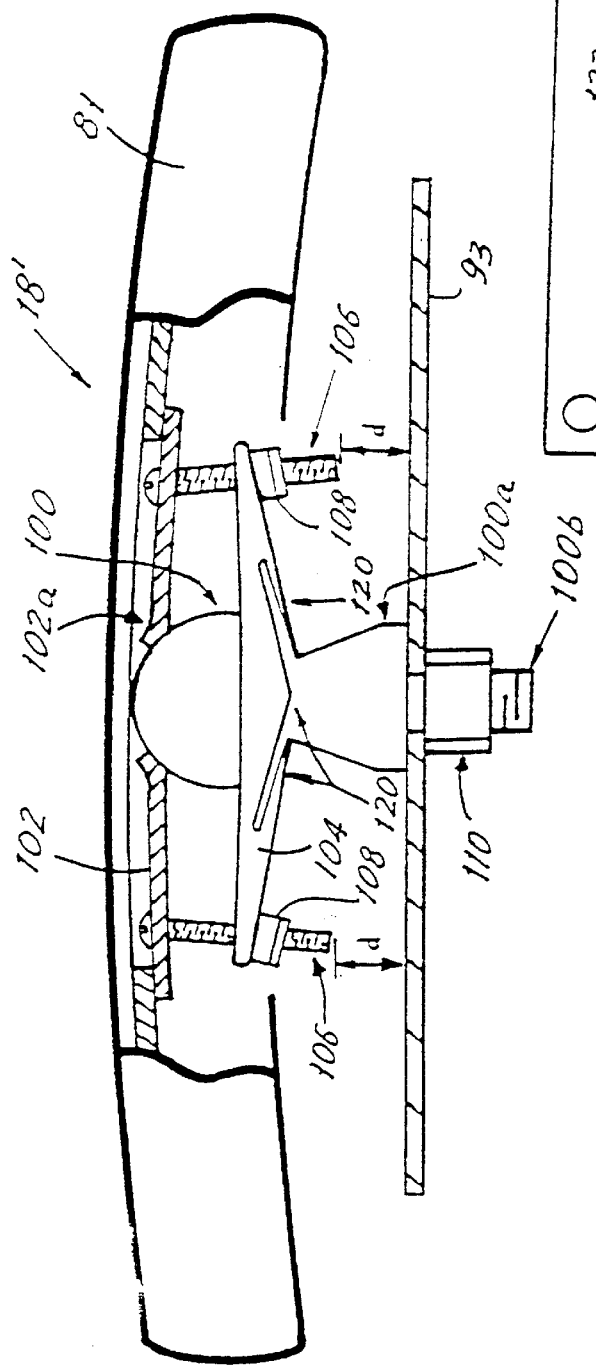
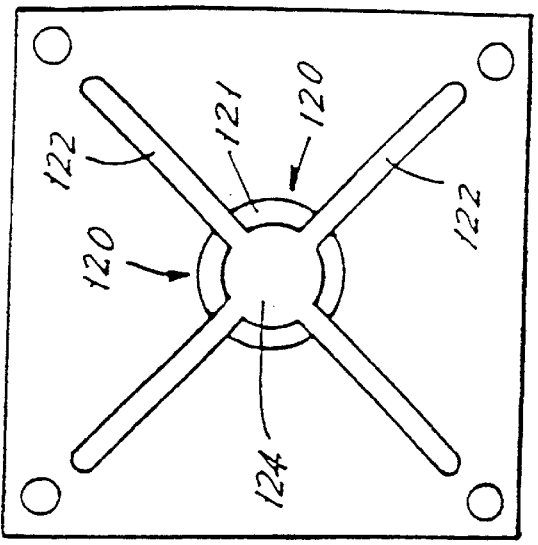
FIG. 10
FIG. 11

SIDE BREAK-AWAY REAR VIEW MIRROR ASSEMBLY WITH TELESCOPIC SUPPORT BRACE

CROSS REFERENCE TO RELATED APPLICATIONS

This Application claims priority and is entitled to the filing date of U.S. Provisional Application Serial No. 60/176,240 filed Jan. 14, 2000, and entitled "SIDE-BREAK-AWAY REAR VIEW MIRROR ASSEMBLY WITH TELESCOPIC SUPPORT BRACE." The aforementioned Provisional Application is a continuation of U.S. Ser. No. 08/989,800, filed Dec. 12, 1997, entitled SINGLE SHELL, DOUBLE VIEW VEHICULAR MIRROR HAVING MANUAL ADJUSTABILITY AND PRECISION HINGE PLATE, U.S. Pat. No. 6,059,419; which in turn is a continuation-in-part application of U.S. Ser. No. 08/799,251, filed Feb. 14, 1997, entitled SINGLE SHELL, DOUBLE VIEW VEHICULAR MIRROR HAVING MANUAL ADJUSTABILITY AND PRECISION HINGE PLATE, U.S. Pat. No. 5,889,627; which in turn is a continuation-in part of U.S. Ser. No. 08/711,810, filed Sep. 10, 1996, entitled SINGLE SHELL, DOUBLE VIEW MIRROR FOR VEHICLES, now abandoned; which in turn claims priority to United States Provisional Application No. 60/009,784, filed Jan. 16, 1996, entitled SINGLE SHELL, DOUBLE VIEW MIRROR FOR VEHICLES, the entire disclosures of the foregoing applications are hereby incorporated by reference.

BACKGROUND OF THE INVENTION

The present invention generally relates to safety devices for vehicles, and, in particular, to a side-view mirror assembly for a vehicle in the form of and as described in the aforementioned, incorporated by reference, patent applications, but not necessarily limited to a single shell dual-view mirror assembly. More specifically, the invention focuses on concerns and a side break-away rear view mirror assembly with a telescopic support brace.

In the aforementioned patent applications, the side-view mirror assembly includes a support member which is coupled to the vehicle; a shell housing having a mounting hole for receiving the support member; a support member mounting plate formed of a substantially rigid material, the support member mounting plate being disposed in and coupled to the shell housing, the support member being fixedly coupled to the support member; and a mirror unit being disposed within the shell housing, but being coupled directly to and supported by the support member mounting plate, such that the mirror unit is substantially rigidly coupled to the support member without being supported by the shell housing.

The disclosures incorporated by reference teach a hinge member as well as a hinge plate and related structural components which allow the mirror unit to swing away from its normal position both to accommodate the operator's desire to adjust the position of the mirror or to allow the shell housing to collapse due to collision with an obstacle.

Despite the extensive measures taken in the construction of the mirror support assembly disclosed in the incorporated by reference applications, there is still a possibility under certain circumstances for the mirror to be subject to vibrations.

The present application provides measures that deal with, remedy or substantially eliminate such vibrations.

SUMMARY OF THE INVENTION

Accordingly, it is an object of the present invention to provide a more effective, improved mirror assembly for vehicles such as school buses, transit buses, trucks and the like.

Another object of the present invention is to provide a mirror assembly for vehicles which is diverse and easier to use.

Another object of the present invention is to provide the mirror assembly with superior vibration damping features and aerodynamic features for an improved field of view.

In accordance with the present invention, and in connection with vehicular side-view mirror assemblies, which include a support member which is coupled to the vehicle; a shell housing for holding mirror units and mechanically coupled to the support member, there is provided a further anti-vibration expedient in a form of a telescopic arm which serves the dual functions of ameliorating vibration of the housing during use of the mirror assembly while, simultaneously, doing so in a non-rigid fixed mode so as to accommodate the movement of the mirror assembly housing away from the bus or toward the bus, as needed.

Other features and advantages of the invention will become more apparent from the detailed description, which follows.

BRIEF DESCRIPTION OF THE DRAWINGS

FIG. 5 is a side view of the mirror pole assembly of the present invention to which the shell housing is attached;

FIG. 5b is a side view of a first housing member of the mirror pole assembly of the present invention;

FIG. 10 is a cross-sectional view of an alternative embodiment of the mirror assembly of the present invention;

FIG. 11 is a top plan view of a spring plate of the mirror assembly shown in FIG. 10;

FIG. 12b is a side view of the hinge plate of FIG. 12a;

FIG. 12c is a rear elevational view of the hinge plate of FIG. 12a;

FIG. 15b is a side view of the mirror pole mounting plate of FIG. 15a.

DETAILED DESCRIPTION OF EMBODIMENTS OF THE INVENTION

Figure 1:
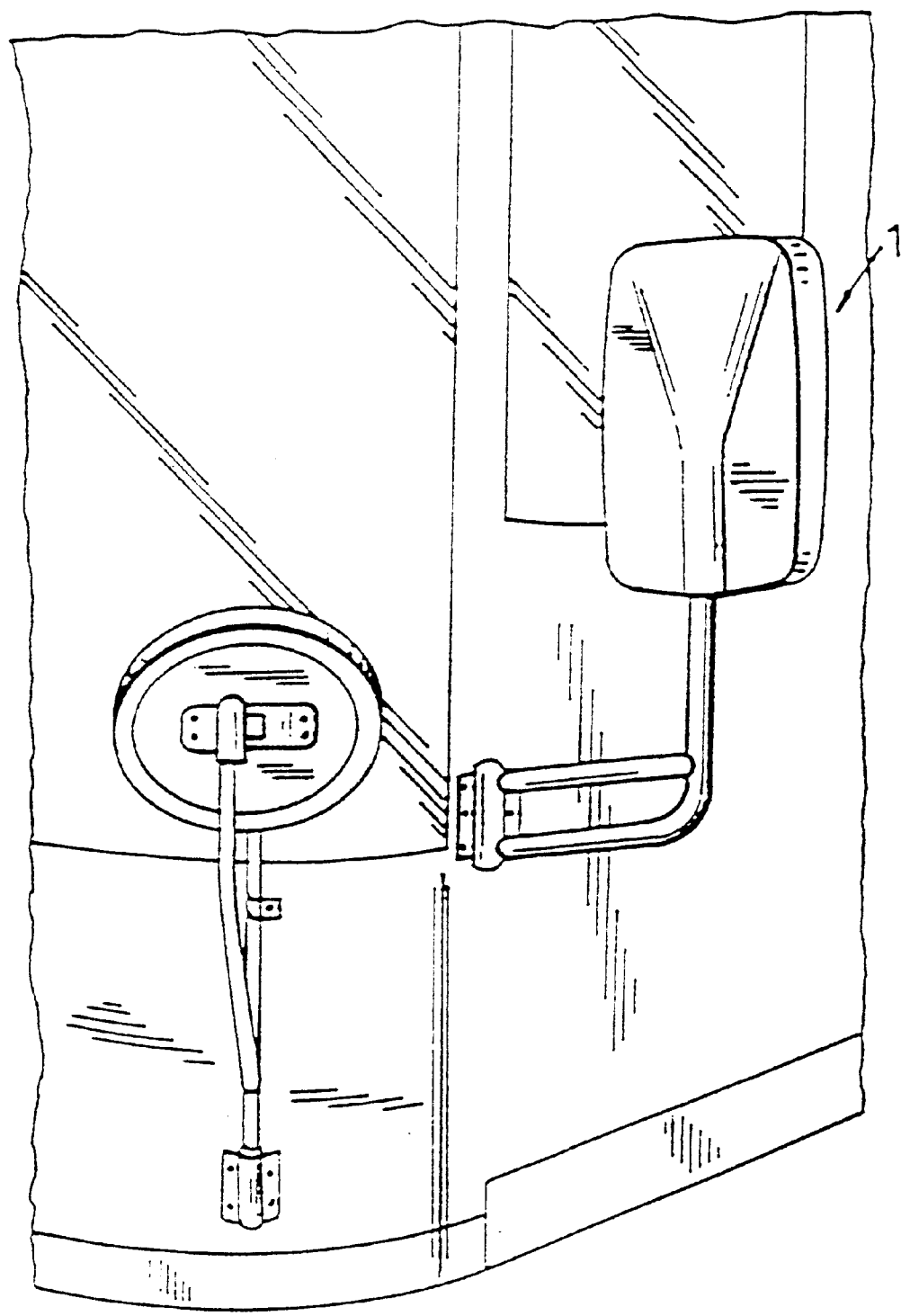
FIG. 1 is a perspective view of the mirror assembly mounted to a school bus and providing a side-view thereof in accordance with the present invention.
Figure 2:
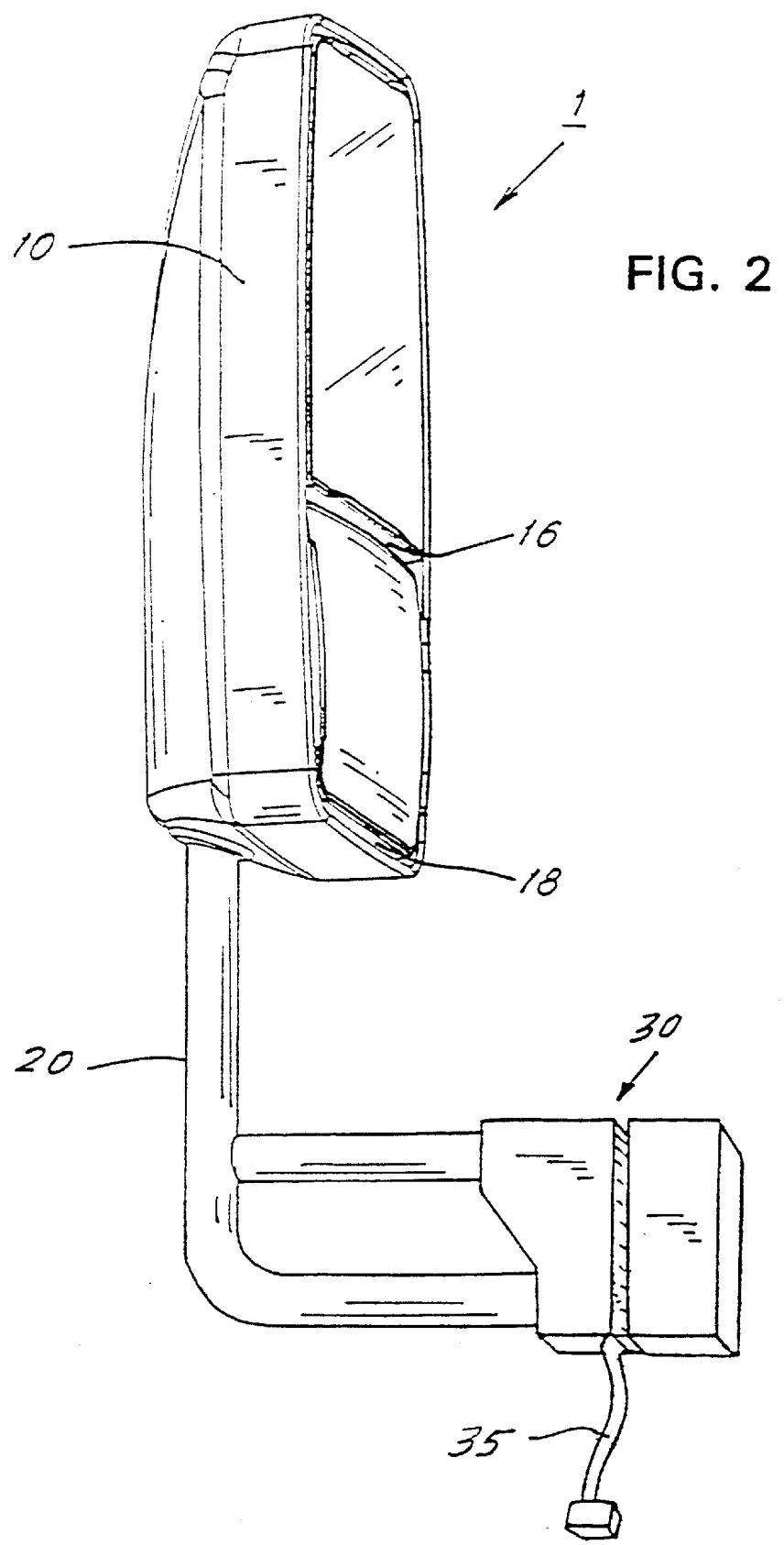
FIG. 2 is a perspective view of the mirror assembly of the present invention from the front and not mounted to a vehicle.

The mirror assembly 1 of the present invention is mounted to a school bus and provides an ample field of view along the side of the vehicle as well as a view which is directed more towards the ground. FIG. 2 shows a mirror assembly 1 which is not mounted to a vehicle. The mirror assembly 1 comprises a shell housing 10, a mirror pole 20 and a hinge member 30. The shell housing 10 has a substantially rectangularly shaped opening 14 and interior space and contains a rectangularly shaped first mirror unit 16 and a convex-surfaced second mirror unit 18. An electrical cable section (or harness) 35 extends from the hinge member 30 for providing electrical connections between a motor control switch (not shown) and the motors (not shown) contained in the first mirror unit 16 and the second mirror unit 18.

The exploded view (FIG. 3) of the mirror assembly 1 of the present invention shows first and second mirror units 16, 18 which are mounted in the shell housing 10 such that the reflecting surfaces of the mirrors 60, 80 lie substantially parallel to the plane of the opening 14. Mounting hole 11 provides an opening for the mirror pole 20 to enter the shell housing 10. A grommet 22 is disposed in the mounting hole 11 and prevents moisture, dirt and the like from entering the shell housing 10 through the mounting hole 11. The mirror pole 20 comprises a first support arm 26 and a second support arm 28 each having a mounting hole 21 on its distal end.

Note that the mirror assembly 1 may be mounted on a vehicle body such that the shell housing 10 is below the hinge member 30 thereby being in the opposite vertical orientation from that shown in FIGS. 2 and 3. When the mirror assembly 1 is in such opposite, vertical orientation, the grommet 22 also prevents water, dirt of the like from entering the shell housing 10 through the mounting hole 11.

Figure 4:
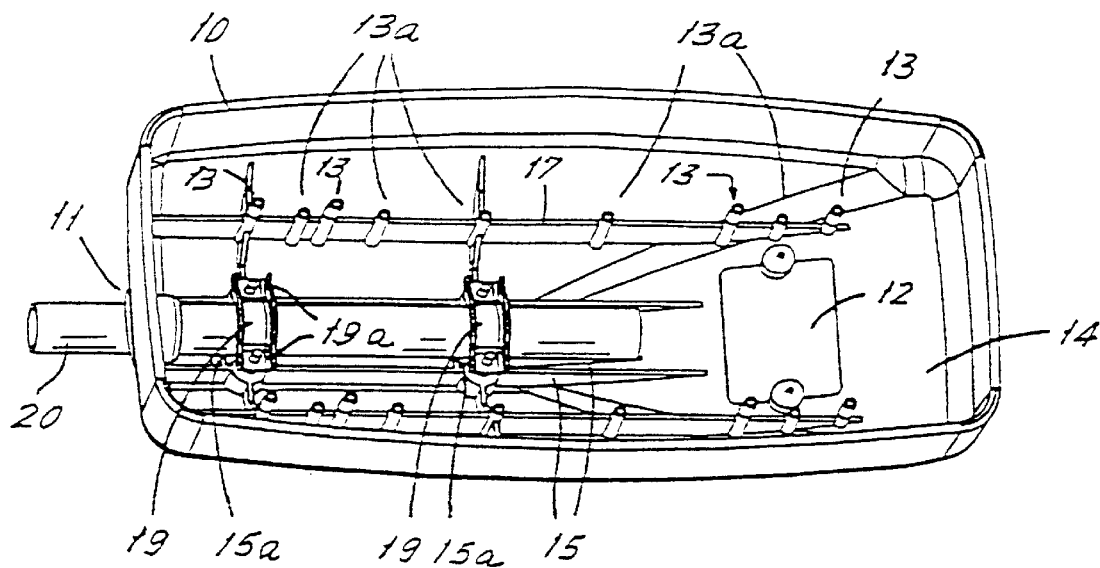
FIG. 4 is a perspective view of a shell housing of the mirror assembly of the present invention with the mirror elements removed.

With reference to FIG. 4, the shell housing 10 comprises a mounting hole 11, clamping plates 19, and longitudinal reinforcing ribs 15 for accepting the mirror pole 20 and operatively connecting the shell housing 10 and the mirror pole 20. The mirror pole 20 is disposed through the mounting hole 11 and under the clamping plates 19. The longitudinal reinforcing ribs 15 are disposed along the wall of the shell housing 10 to provide structural reinforcement for clamping the mirror pole 20 to the shell housing 10. The height of the outermost longitudinal reinforcing ribs 15, with respect to the wall of the shell housing 10, are higher than the innermost longitudinal reinforcing ribs 15 thereby defining an arcuate cross section (or resting surface) for snugly engaging the mirror pole 20. Orthogonal reinforcing ribs 15a are disposed near the clamping plates 19 to provide additional structural support. The clamping plates 19 are securely engaged against the mirror pole 20 via rear entry bolts 19a.

Figure 4A:
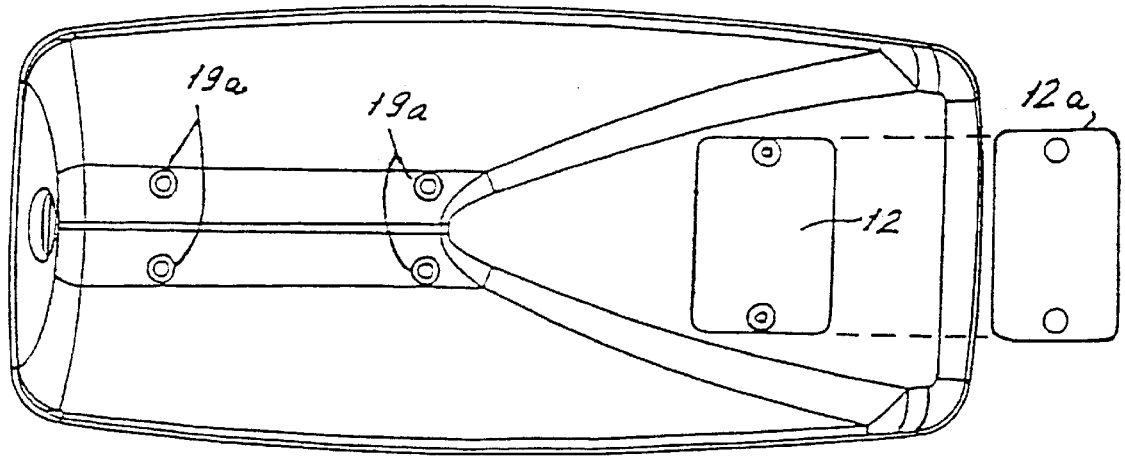
FIG. 4a is a view of the windward side of the mirror assembly of the present invention.

As best seen in FIG. 4a, the rear entry bolts 19a are tightened from the rear (windward) side of the shell housing 10. The shell housing 10 is provided with countersunk holes which accept the rear entry bolts 19a and permit sub-flush disposition of the bolts 19a. Further, rubber covers (not shown) are disposed over the countersunk holes to provide a smooth and flush finish on the windward side of the shell housing 10 which adds to the aerodynamic design of the shell housing 10.

As best seen in FIG. 2, the housing shell 10 is aerodynamically shaped. Specifically, the forward surface of the shell housing 10 is narrow and tapers outward toward the opening 14, which accepts the mirror units 16, 18. Therefore, wind resistance and vibrations caused by wind velocity are reduced and the tendency for the shell housing 10 to shift or turn as a result of torsional forces developed on the mirror pole 20 from wind are mitigated.

The shell housing 10 further comprises a cover 12a which snugly fits over the maintenance opening 12. As will be discussed in more detail below, the maintenance opening 12 provides access to the cabling between various electrical components of the mirror assembly 1. The cover 12a fits flush with respect to the surface of the shell housing 10 thereby maintaining the aerodynamic features of the mirror assembly 1. Furthermore, the cover 12 provides a surface for the display of a company name, trademark or other indicia, which display can be easily changed without requiring re-stenciling of the shell housing 10 of the mirror assembly 1. Rather, the simple and inexpensive step of replacing the cover 12a with a new cover displaying the new indicia completes the process.

Referring to FIG. 4, the shell housing 10 is provided with oppositely disposed supporting ribs 17 which extend along the wall of the shell housing 10 and terminate on end surfaces of the shell housing 10. Integral with the supporting ribs 17 are long standoffs 13 and short standoffs 13a. Four long standoffs 13 are disposed at each of the ends of the shell housing 10. Ten short standoffs 13a are disposed between the long standoffs 13 and are also integral to the support ribs 17. As will be discussed below, the long standoffs 13 and the short standoffs 13a provide a supporting structure for the first and second mirror units 16, 18.

Figure 5A:
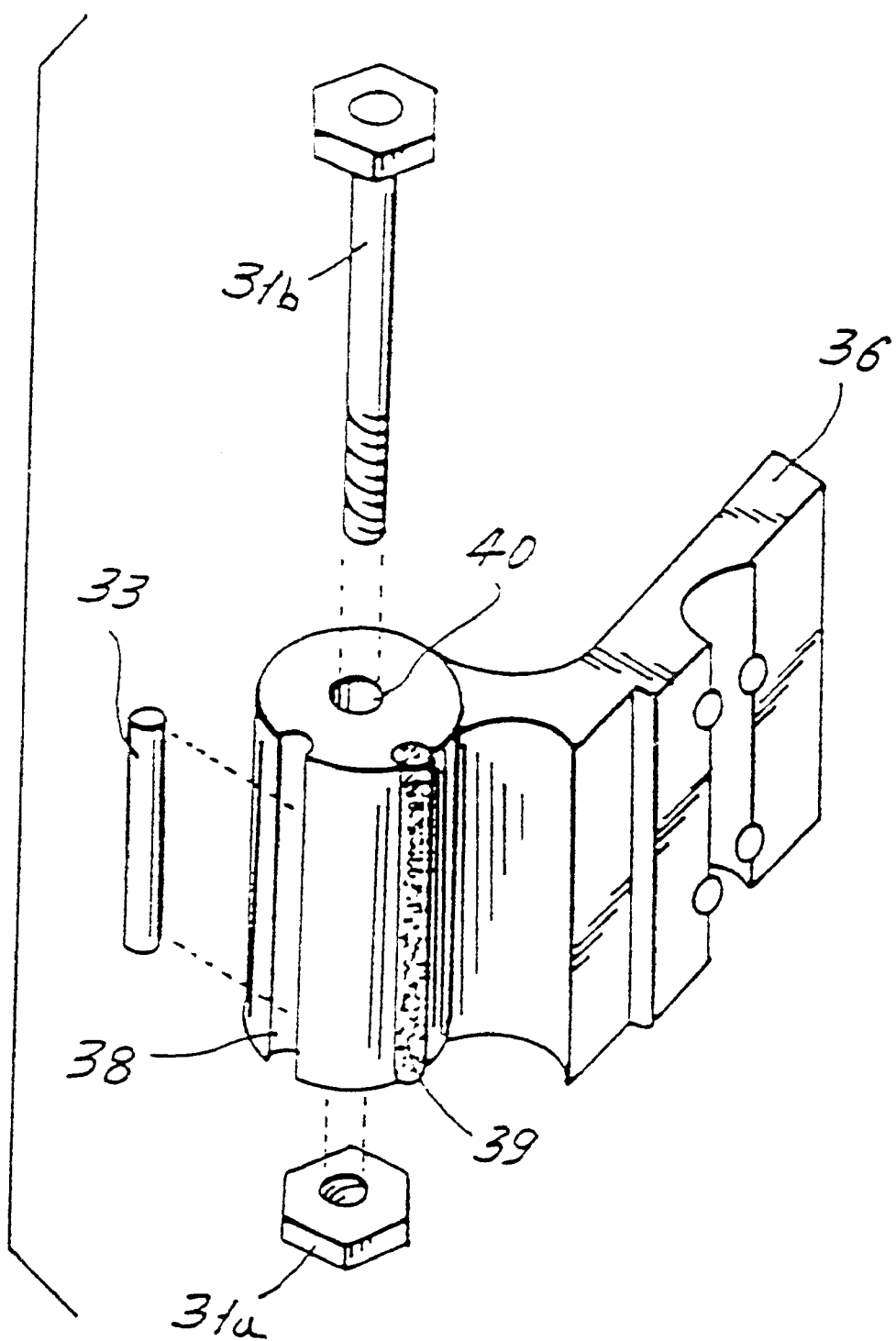
FIG. 5a is a perspective view of a hinge plate of the mirror pole assembly of the present invention.

With reference to FIG. 5, the mirror pole 20 and the hinge member 30 are shown. The hinge member 30 comprises a first housing member 32 and a second housing member 34 which fit snugly around the first and second support arms 26, 28. As shown in FIG. 5a, hinge plate 36 operatively connects to the first housing member 32 via a nut 31a and precision bolt 31b and anti-scoring washers 37.

First and second support arms 26, 28 which extend from the mirror pole 20 are insertable into the hinge member 30 by way of arcuate recesses in the first and second housing members 32, 34 of the hinge member 30. More specifically, the second housing member 34 is removable from the first housing member 32 thereby exposing the arcuate recesses for engaging the first and second support arms 26, 28. The first and second support arms 26, 28 are inserted into the arcuate recess of the first housing member 32 and the mounting holes 21, disposed on the distal ends of first and second support arms 26, 28, are lined up with the holes 21a of the first and second housing members 32, 34. Allen-type bolts are inserted into the holes 21a which clamp the first and second housing members 32 and 34 together and further engage the first and second support arms 26, 28 of the mirror pole 20.

The second housing member 34 of the hinge member 30 operatively connects to the hinge plate 36 via a nut and a precision bolt 31a, 31b (FIG. 5a), anti-scoring washers 37 and a precision bore 40. Thus, the precision bolt 31b passing through the first housing member 32, the anti-scoring washers 37 and the precision bore 40 of the hinge plate 36 enable the hinge plate 36 to swivel with respect to the first housing member 32. Accordingly, the mirror assembly 1 can swivel with respect to the vehicle to which it is mounted if sufficient force is exerted in torsional relation to the hinge member 30.

Further, anti-scoring washers 37 mitigate any deterioration in the precision dimensions of the hinge plate 36 and, in particular, the precision bore 40 when the hinge plate 36 is swivelled in relation to the first housing member 32. It is preferred that anti-scoring washers 37 be fabricated from a softer material than the hinge plate 6. For example, when the hinge plate 6 is formed of steel, it is preferred that the anti-scoring washers 37 be fabricated from brass.

The first housing member 32 and the hinge plate 36 are provided with a detent means for fixing the relative position of the hinge plate 36 with respect to the first housing member 32. Specifically, the first housing member 32 is provided with a cavity 42. Cavity 42 contains a spring (not shown) and a piston 44 disposed forward of the spring and extending beyond the surface of the first housing member 32. As best seen in FIG. 5b, the piston 44 comprises a channel 45 extending diametrically across the top surface of the piston 44. The surface of the first housing member 32 comprises a cooperating notch 46 with the channel 45 in the piston 44 for engagement with a detent member 33. When the hinge plate 36 is in position, with the precision bolt 31b passing through the first housing member 32 and the precision bore 40 of the hinge plate 36, the detent member 33 operatively engages both the channel 45 and an inward detent 38 of the hinge plate 36. The notch 46 in the surface of the first housing member 32 provides relief for accepting the detent member 33 so that the detent member does not contact the first housing member 32. Thus, the hinge plate 36 is held in a fixed relationship with respect to the first housing member 32 and, accordingly, the mirror assembly 1 is held in a fixed relationship with respect to the vehicle to which it is attached.

However, sufficient torsional force on the hinge plate 36 with respect to the first housing member 32 will force the piston 44 inwardly and release the detent member 33 from the channel 45 and the inward detent 38, thereby permitting swingable movement of the mirror pole 20 with respect to the hinge plate 36. When the hinge plate 36 is rotated sufficiently with respect to the first housing member 32, the outward detent 39 will engage the channel 45 of the piston 44 and the hinge plate 36 will again be fixed in position relative to the first housing member 32, but at a different position. The cooperation of the outward detent 39 and the channel 45 of the piston 44 define a maximum rotational position to prevent vehicle damage when the mirror assembly 1 is rotated with respect to the vehicle, for example, when an object is struck while in motion.

Moreover, the precise sizing of the precision bolt 31b and the precision bore 40 coupled with the high force provided by the spring, the channel 45, the detent member 33, and the inward detent 38, minimizes vibrations developed during vehicular travel, which vibrations tend to propagate through the hinge plate 36, the hinge member 30 and the mirror pole 20 to the first and second mirror units 16, 18.

Furthermore, for large vehicles, the first and second support arms 26, 28 are extended and protrude much further from the arcuate recesses of the first and second housing members 32, 34. To mitigate against vibrations developing in the support arms 26 and 28, a core material 23 is added to the inside volume of the first and second support arms 26, 28 and the mirror pole 20. It is preferred that the core material 23 is of a dissimilar metal than that of the mirror pole 20 and the first and second support arms 26, 28 because experiments have shown that vibrations are reduced when dissimilar metals are used. Specifically, it is preferred that the mirror pole 20 and the first and second support arms 26, 28 are fabricated from steel tubing and the core material 23 is fabricated from aluminum tubing.

The novel, sturdy and aerodynamic features of the shell housing 10, the mirror pole 20 and the hinge member 30, described above, enable one-point connection of the mirror assembly 1 to the vehicle via hinge plate 36 without sacrificing vibration dampening characteristics.

With reference to FIGS. 12a, 12b, 12c and 13 an alternate embodiment of a hinge plate 36' is shown. As shown, the hinge plate 36' is fin shaped having a contoured edge 200 shaped to fit along door member 218 and an edge 216 of window 212. Integrally coupled to the hinge plate 36' is a mounting member 202 which includes a precision bore 40' and inward detent 38' which function in a substantially similar manner as the precision bore 40 and inward detent 38' of the hinge plate 36 discussed above.

Figure 13:
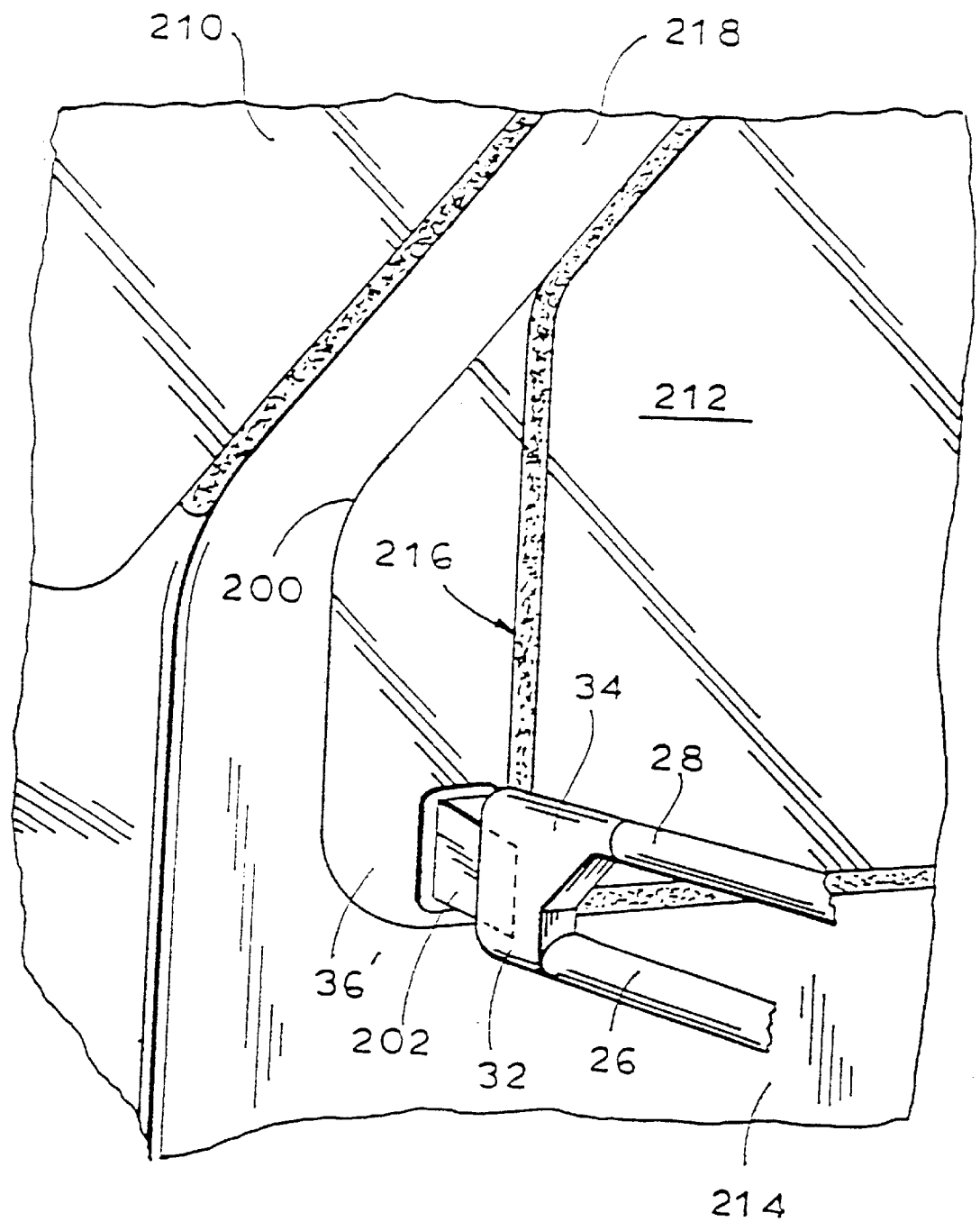
FIG. 13 is a perspective view of the hinge plate of FIG. 12a mounted on a vehicle.

As best seen in FIG. 13, the hinge plate 36' is precisely formed and contoured to mount to the door 214 of a vehicle. FIG. 13 illustrates the relationship between the windshield 210, the driver's side door 214, the driver's side window 212 and the hinge plate 36'. A stock mounting plate (similar to the hinge plate 361 but without the mounting member 202) is provided on some vehicles by the vehicle manufacturer, for example, on some Ford buses. Without the mounting member 202, a mirror assembly 1 cannot be immediately attached to the stock plate; however, as shown in FIG. 13, the first and second housing members 32, 34 may readily be coupled to the mounting member 202 of the hinge plate 36'.

Figure 12C:
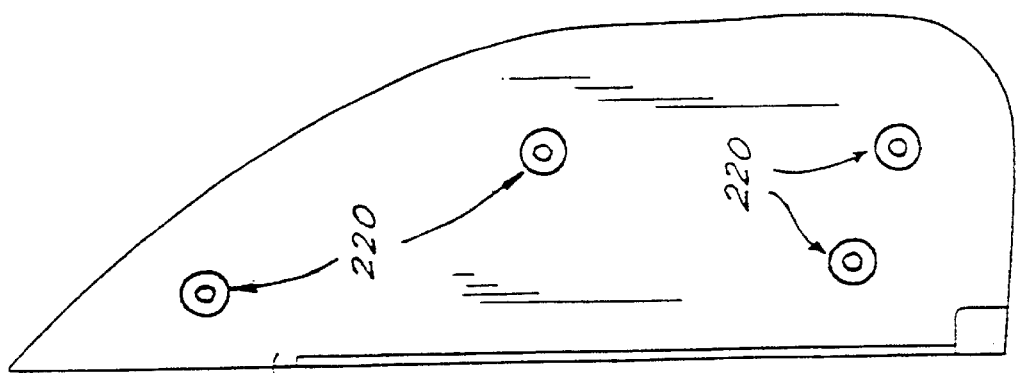
Figure 12B:
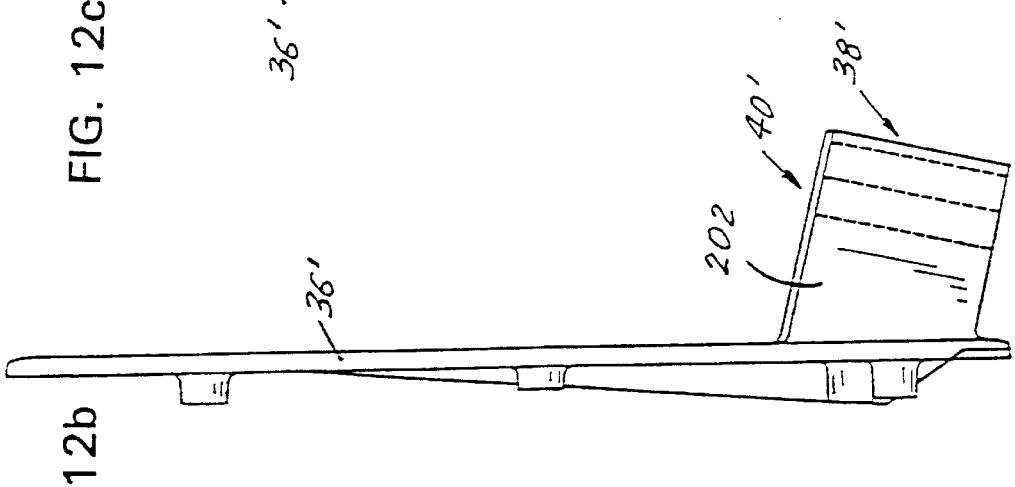
Figure 12A:
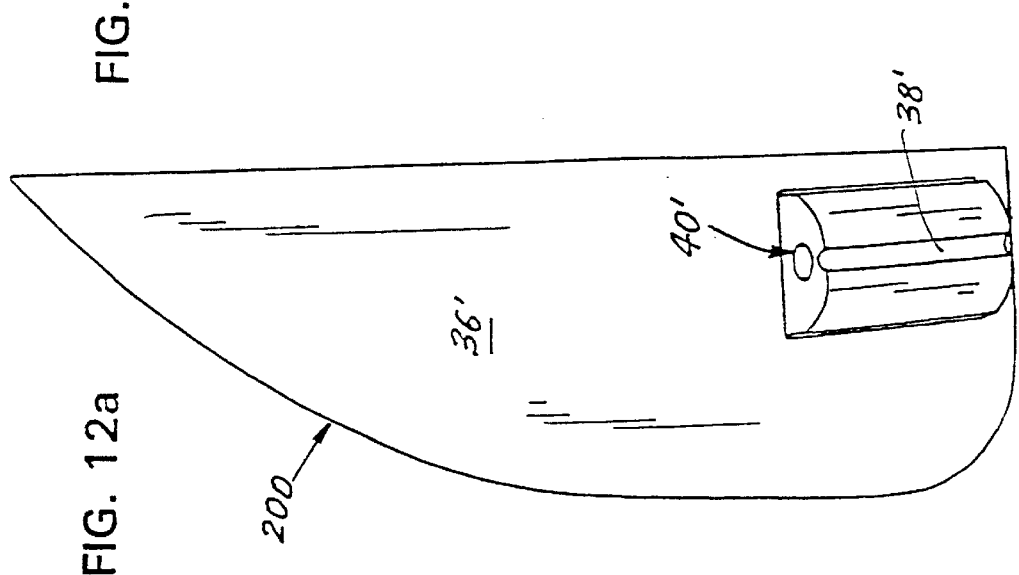
FIG. 12a is a front elevational view of an alternative hinge plate of the mirror assembly of the present invention.

As shown in FIG. 12b, the mounting member 202 preferably extends from the hinge plate 36' at an angle such that, when the hinge plate 36' is mounted on a vehicle. The mounting member 202 extends away from the hinge plate with the bore 40' extending substantially vertically and the support arms 26, 28 extending from the housing member 34. The hinge plate 36' is provided with mounting holes 220 which are positioned in accordance with the positions of the mounting holes of the stock plate (not shown) such that new mounting holes need not be formed on the hinge plate 36'. The mounting holes 220 may be internally threaded.

Figure 6:
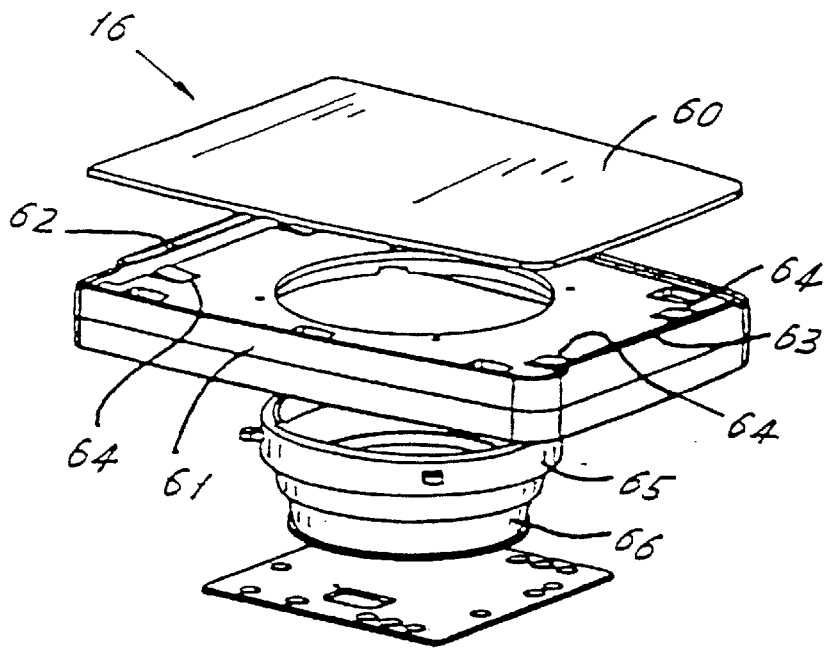
FIG. 6 is an exploded perspective view of a mirror unit of the present invention.

With reference to FIG. 6, the rectangularly shaped first mirror unit 16 is shown in greater detail. The first mirror unit 16 comprises a flat mirror 60, a flat mounting plate 61, a cup 65 and a swivel mechanism 66. The swivel mechanism 66 moves in relationship to the cup 65. The cup 65 is dome shaped on the bottom and operatively engages the dome shaped member of the swivel mechanism 66 which provides a swivelling motion in both horizontal and vertical directions. Gearing and swivel members (not shown) are connected to the cup 65 and to two motors (not shown) of the swivel mechanism 66 to enable motorized swiveling of the cup 65 with respect to the swivel mechanism 66 in a manner well known in the art. A boot (not shown) covers the critical elements of the swivel mechanism 66 and the cup 65 to prevent debris from deteriorating the operation of the first mirror unit 16.

The flat mirror 60 is disposed on a flat mounting plate 61 and secured at its edges by a long snap 62 and a short snap 63. Relative ease of installation of the flat mirror 60 onto the flat mounting plate 61 is achieved by first inserting one edge of flat mirror 60 under one of the long snap 62 and the short snap 63 and then pressing the other end of flat mirror 60 under the remaining snap to obtain secure engagement of the flat mirror 60 to the flat mounting plate 61. It is preferred that one edge of the flat mirror 60 is first placed under the long snap 62 and then the other end of flat mirror 60 is snapped under short snap 63.

The ease with which the flat mirror 60 is secured to, and removed from, the flat mounting plate 61 enables field replaceability and retrofitability of the flat mirror 60, for example, when the flat mirror 60 is accidentally broken.

Vibration tabs 64 extend somewhat above the plane of the flat mounting plate 61 and are elastically biased to engage the rear surface of the flat mirror 60 when the mirror is engaged under the long snap 62 and the short snap 63. The force exerted by the vibration tabs 64 to the rear surface of the flat mirror 60 prevents vibrations in the flat mirror 60 when the vehicle is in motion or when vibrations are transmitted to the first mirror unit 16 from other sources such as, for example, from the engine of the vehicle.

Figure 6A:
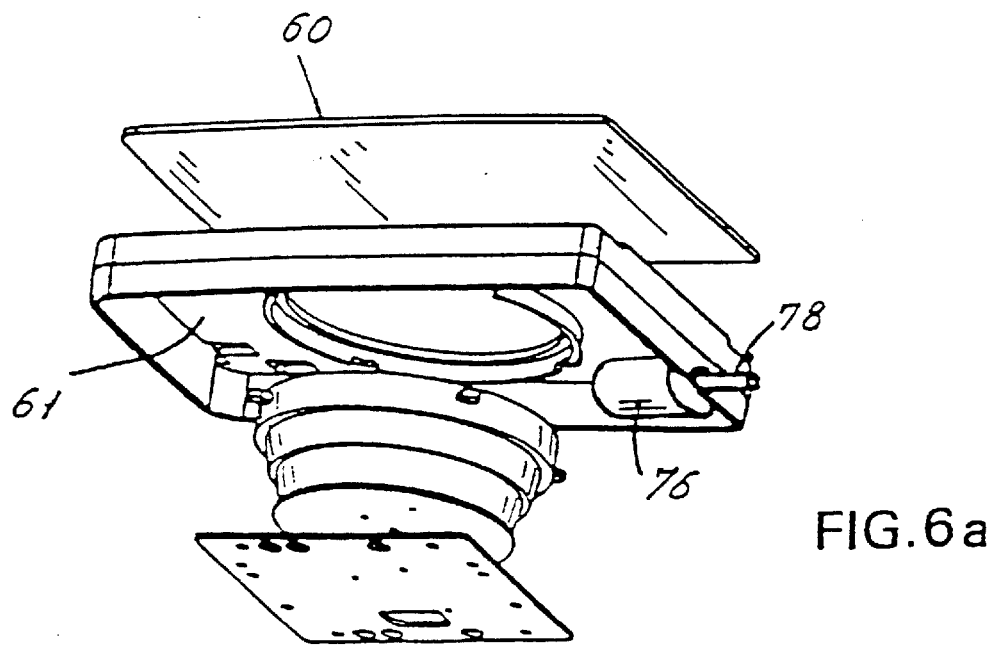
FIG. 6a is an exploded perspective rear view of the mirror unit of FIG. 6.

With reference to FIG. 6a, an electro-mechanical solenoid 76 may be coupled to the mounting plate 61, which solenoid 76 comprises a core 78 and a spring (not shown). The mounting plate 61 is provided with a hole so that the core 78 projects out of the hole. The spring forces the core 78 outwardly from the solenoid body when the solenoid 76 is not energized. When the solenoid is energized, the core 78 moves inwardly and overcomes the force exerted by the spring, which spring tends to keep the core 78 in the outward position.

The solenoid 76 is positioned such that the core 78 contacts the inside surface of the shell housing 10 when the solenoid is not energized and the spring forces the core 78 into its outward position. Therefore, when the solenoid is not energized, vibrations of the flat mounting plate 61 with respect to the shell housing 10 are damped.

However, when it is desired that the position of the first mirror unit 16 be changed via the motors of the swivel mechanism 66, the solenoid 76 is concurrently energized with the motors (via the motor control switch) such that the core 78 is drawn inwardly and away from the inside surface of the shell housing 10 thus enabling free movement of the flat plate 61 with respect to the swivel mechanism 66. Further, when the first mirror unit 16 has reached the desired position and the motors of the swivel mechanism 66 are deactivated, the solenoid 76 is also deactivated and the core 78 returns to its resting position against the inside surface of the shell housing 10.

Figure 7:
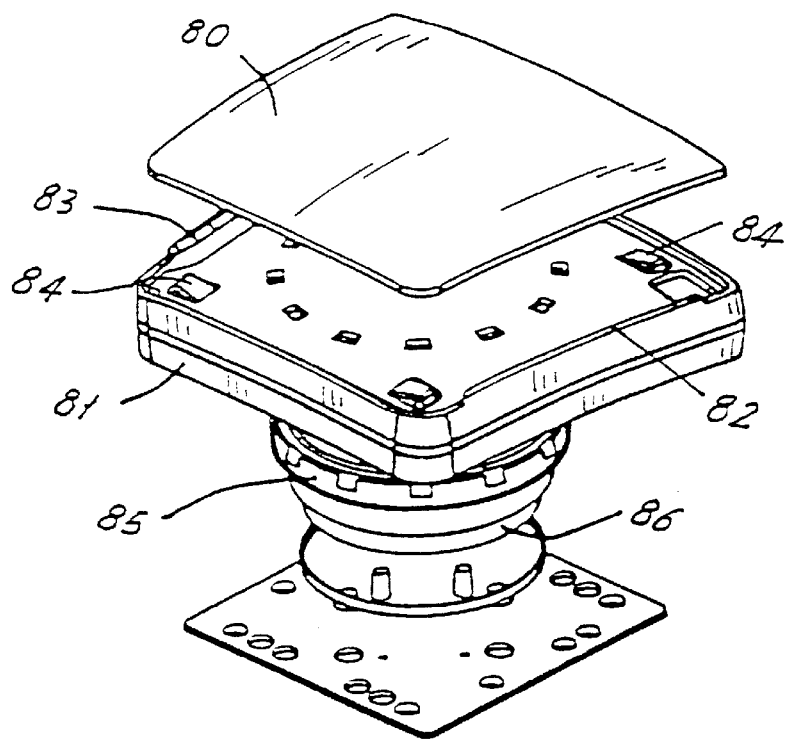
FIG. 7 is an exploded perspective view of a mirror unit of the present invention.
Figure 7A:
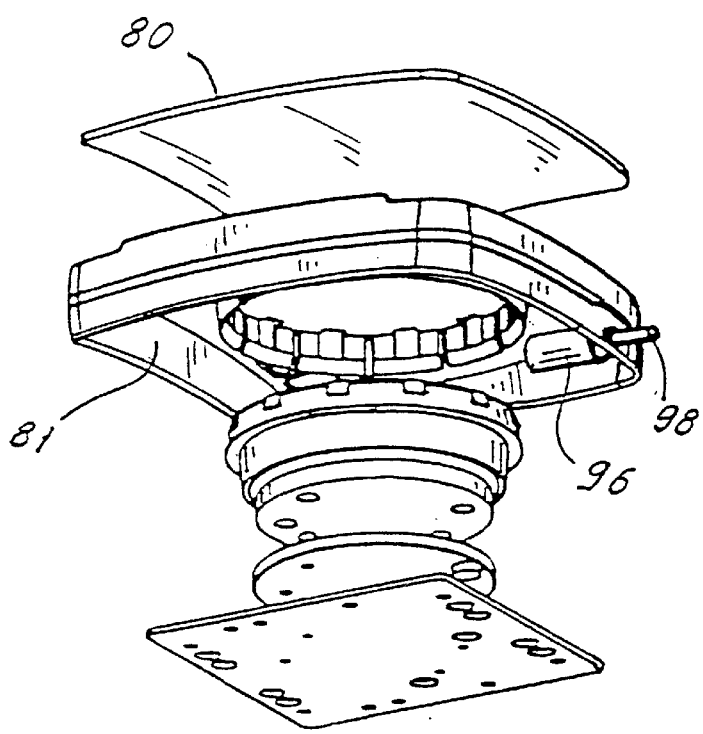
FIG. 7a is an exploded perspective rear view of mirror unit of FIG. 7.

With reference to FIG. 7, a more detailed drawing of the convex-surfaced second mirror unit 18 is shown. The second mirror unit 18 comprises a convex mirror 80, a convex mounting plate 81, a cup 85 and a swivel mechanism 86. The swivel mechanism 86 comprises two motors (not shown) which are coupled via gearing to the cup 85 to enable motorized swiveling of the cup with respect to the swivel mechanism 86. The convex mounting plate 81 comprises a long snap 82, a short snap 83, and vibration tabs 84. The swivel mechanism 86 may optionally comprise an electro-mechanical solenoid 96, where the solenoid comprises a core 98 and a spring (not shown). The operation of the motorized features and anti-vibration features of the convex-surfaced second mirror unit 18 are substantially similar to the same features of the rectangularly shaped first mirror unit 16 and, therefore, a detailed recitation of the interconnection and operation of the aforementioned elements of the second mirror unit 18 is omitted.

With reference to FIGS. 10 and 11, an alternate embodiment of the second mirror unit 18' is now described. The embodiment of the second mirror unit 18' enables a user to manually adjust the convex mounting plate 81 rather than requiring motorized swiveling. In order to provide manual adjustment, the second mirror unit 18' includes a ball joint 100 journaled between a fixed plate 102 and a spring plate 104. The ball joint 100 is integrally coupled to a base portion 100a where the base portion 100a fixes the ball joint 100 to the connecting plate 93 via a threaded member 100b and a nut 110.

The fixed plate 102 is mounted to the convex mounting plate 81 via any suitable means, e.g., glue and spring clips. The fixed plate 102 includes a flanged opening 102a which operatively engages the curved surface of the ball joint 100. The spring plate 104 includes cantilever members 120 formed by cutaway portions 122 which springably bias against the ball joint 100. The spring plate 104 also includes flanges 121 at the distal ends of the cantilever members 120 for defining an opening 124 (FIG. 11), which flanges 121 operatively engage the ball joint 100.

Four threaded members 106 (preferably machine screws or the like) extend from the fixed plate 102 to the spring plate 104 to couple the plates together and capture the ball joint therebetween. Only two threaded members 106 are shown in FIG. 10. Restraining members 108 (preferably machine screw nuts) operatively engage the threaded members 106 to move and urge the spring plate 104 towards the fixed plate 102. As the nuts 108 are tightened, the cantilever members 120 apply a spring force to the surface of the ball joint 100 which generates enough friction to maintain the convex mounting member 81 in a desired position but also permits movement of the mounting member 81 as desired.

It is noted that the cut away portions 122 of the spring plate 104 are positioned such that, after a predetermined amount of tightening of the nuts 108, the compression force of the cantilever members 120 against the ball joint 100 does not substantially change. In other words, after predetermined tightening, the cantilever members 120 of the spring plate 104 exhibit a substantially constant spring force despite further tightening of the nuts 108. Among other advantages, such a configuration enables efficient and inexpensive manufacture of the mirror unit 18'.

In FIG. 10, the distance ("d") between the free ends of the screws 106 and the connecting plate 93 is carefully selected to limit the maximum tilting angle of the convex mounting plate 81 relative to the stationary or immobile connecting plate 93. More specifically, the spacing "d" is selected such that under maximum tilting conditions, the convex mounting plate 81 does not protrude beyond the opening 14 of the shell housing 10 (FIG. 3). The screws 106 therefore serve the dual purposes of adjusting the tension on the ball joint 100 and limiting the maximum tilting angle of the convex mirror mounting plate 81.

It has been found that the manual adjustability of the mirror unit 18' is suitably accomplished when the ball joint 100 is fabricated from a suitable plastic material and that the spring plate 104 is fabricated from phosphor bronze although other materials may be used.

It is noted that the manual adjusting feature discussed hereinabove may be readily adapted for use on the flat mirror unit 16 as would be apparent to those skilled in the art.

Figure 3:
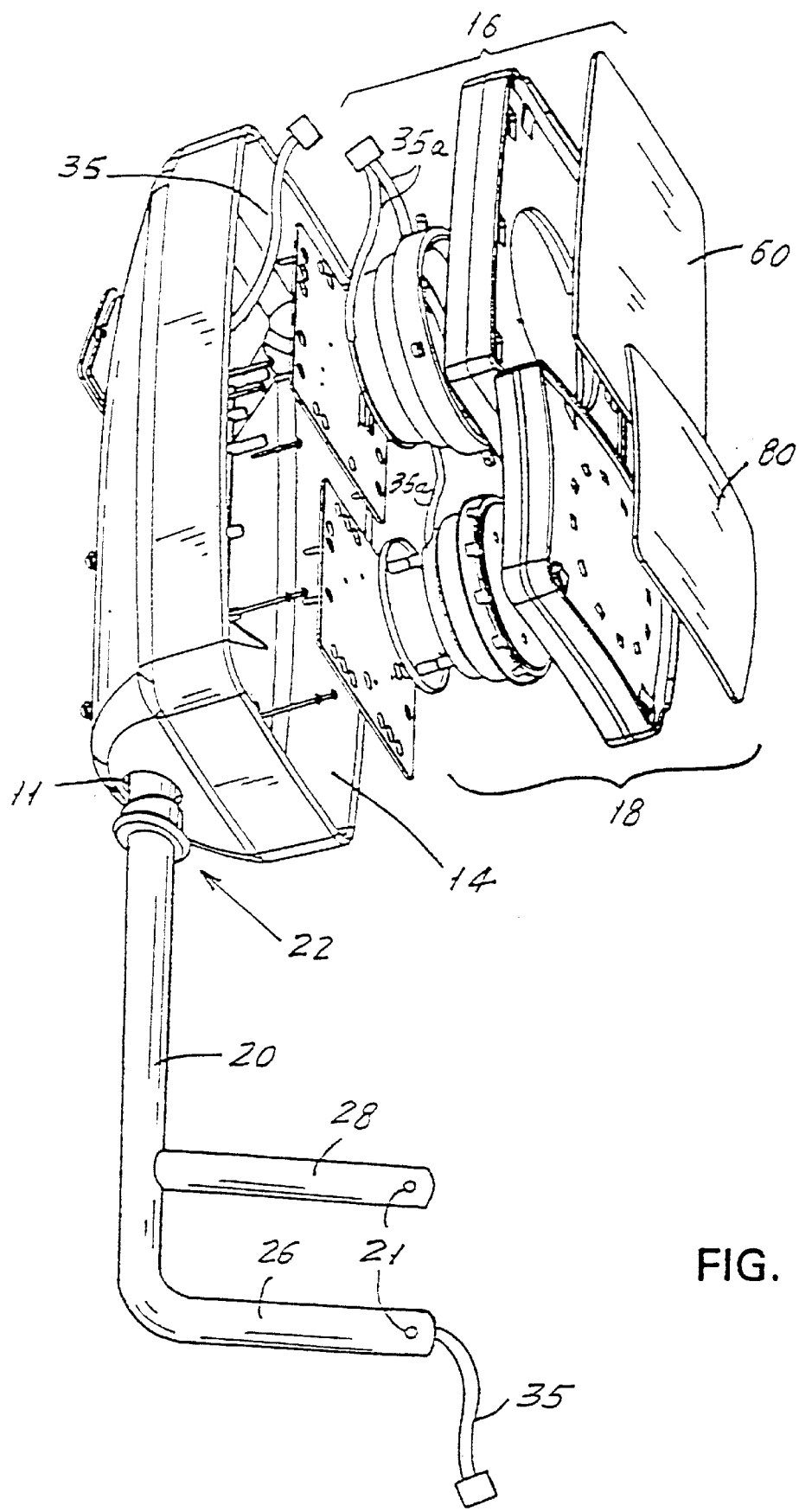
FIG. 3 is an exploded view of the mirror assembly of the present invention.

With reference to FIGS. 3, 4, 6 and 7, a description of the interconnections between the first and second mirror units 16, 18 and the shell housing 10 will now be described. The first mirror unit 16 may be positioned away from the mounting hole 11 towards one end of the shell housing 10 and the second mirror unit 18 may be positioned near the mounting hole 11 and below the first mirror unit 16 as shown in FIG. 3. However, when the end user is desirous to have the second mirror unit 18 positioned away from the mounting hole 11 towards one end of the shell housing 10 and the first mirror unit 16 positioned towards the mounting hole 11 and below the second mirror unit 18, the mirror assembly 1 is easily adapted.

For example, in some instances, attachment of the mirror assembly 1 to the vehicle requires that the hinge plate 36 be positioned above the shell housing 10, where the mounting hole 11 would be in a upward vertical orientation. In such a situation, the end user of the mirror assembly 1 may desire to have the first mirror unit 16 positioned above the second mirror unit 18 because of the unique optical characteristics of a convex mirror versus a flat mirror. Typically, mounting the mirror assembly 1 with the hinge plate 36 above the shell housing 10 would result in the convex-surfaced second mirror unit 18 being disposed above the rectangularly shaped first mirror unit 16. However, with the novel configuration of the shell housing 10 and the first and second mirror units 16, 18 of the present invention, an inversely mounted mirror assembly 1 (where the hinge plate 36 is mounted on the vehicle above the shell housing 10) would not necessarily result in the first mirror unit 16 being disposed beneath the second mirror unit 18. Indeed, the first and second mirror units 16, 18 may be readily interchanged and disposed at either end of shell housing 10.

To accommodate the above-described versatility (FIGS. 8 and 9), the long standoffs 13 are positioned at both ends of the shell housing 10 and operatively connect to the swivel mechanism 86 of the convex-surfaced second mirror unit 18 via connecting plate 93 when the second mirror unit 18 is disposed at one of the two ends of the shell housing 10. The short standoffs 13a, which are disposed between long standoffs 13 along the supporting ribs 17, operatively connect with the swivel mechanism 66 of the rectangularly shaped first mirror unit 16 via the connecting plate 73 when the first mirror unit 16 is disposed at one of the ends of the shell housing 10. The longs standoffs 13 and short standoffs 13a are sized such that the long standoffs 13 do not interfere with the connecting plate 73 of the rectangularly shaped first mirror unit 16, irrespective of which end of the shell housing 10 the first mirror unit 16 is disposed. Furthermore, if the end user is desirous of a single mirror unit rather than the first and second mirror units 16, 18 as discussed hereinabove, a larger mounting plate (of the flat-type or convex-type) may be integrated with a stationary cup and a swivel mechanism of the type described for the larger, rectangularly shaped first mirror unit 16. In such a situation, only the short standoffs 13a would be utilized to fasten the coupling plate of the single mirror unit to the shell housing 10.

The shell housing 10, the flat mounting plate 61, the cup 65, the swivel mechanism 66, the connecting plate 73, the convex mounting plate 81, the cup 85, the swivel mechanism 86 and the connecting plate 93 may be manufactured from suitable plastics, metals, composite materials or the like. It is preferred that the above-listed elements be manufactured from suitable plastics. The mirror pole 20 and the hinge member 30 may also be manufactured from suitable plastics, metals, composite materials or the like; however, it is preferred that these elements be manufactured from suitable metals. As described above, it is most preferred that mirror pole 20 and the first and second support arms 26, 28 be manufactured from steel and the core material 23 be manufactured from aluminum.

Installation of the mirror assembly 1 onto a vehicle requires cabling from the motor control switch (typically mounted inside the vehicle) to the respective motors of the swivel mechanism 66 and the swivel mechanism 86. Therefore, the electrical conductors of the electrical cables required to interconnect the electrical components of the mirror assembly 1 are bundled in heat shrinkable sleeves for stiffening and protecting the electrical conductors. The cable section 35 extends from an opening in the second housing member 34 through and to the opposite end of the mirror pole 20. The end of the cable 35 which extends from the bottom of hinge member 30 is electrically and mechanically connected to the electrical conductors of the motor control switch. The other end of the cable section 35 terminates near the maintenance opening 12 of the shell housing 10 when the mirror pole 20 is inserted through the mounting hole 11. A cable section 35a (as shown in FIG. 3) operatively connects to the respective motors of the first mirror unit 16 and the second mirror unit 18 and terminates near the maintenance opening 12 when the mirror units are installed in the shell housing 10. Therefore, after installation of both the mirror pole 20 and the first and second mirror units 16, 18 the electrical connection of the cable section 35 and the cable section 35a may be conveniently made through the maintenance opening 12.

Conversely, in mirror units of the prior art, cable connections are awkwardly made through a mounting hole (similar to mounting hole 11) or such connections are made before a mirror unit is installed into a housing.

Advantageously, the cover 12a of the present invention, which seals the maintenance opening 12, serves the dual purpose of sealing the shell housing 10 after required cable connections are made and provides a convenient and interchangeable surface for displaying a company name, trademark or other indicia.

Still further, the invention contemplates providing a heating element (not shown) inside the shell housing 10 to maintain the mirrors at a desired temperature, so as to prevent fogging or icing of the mirror elements 60, 80.

The mirror assembly 1 of the present invention can be constructed such that the shell housing 10 has a width of approximately 7½ inches and a height of approximately 13–14 inches. The depth of the shell housing 10 tapers toward the center, at its deepest point measuring approximately 3–4 inches.

The larger, first mirror unit 16 may have a width of approximately 6 to 7 inches and a height of approximately 9–10 inches. The smaller, second mirror unit 18 has a height of approximately 4 to 4½ inches and a width of approximately 7 inches. These dimensions are significant in that they have been selected to reduce the size of the blind spot in front of the mirror assembly while providing a more than sufficient rearward field of view, in full compliance with regulatory requirements.

Figure 14:
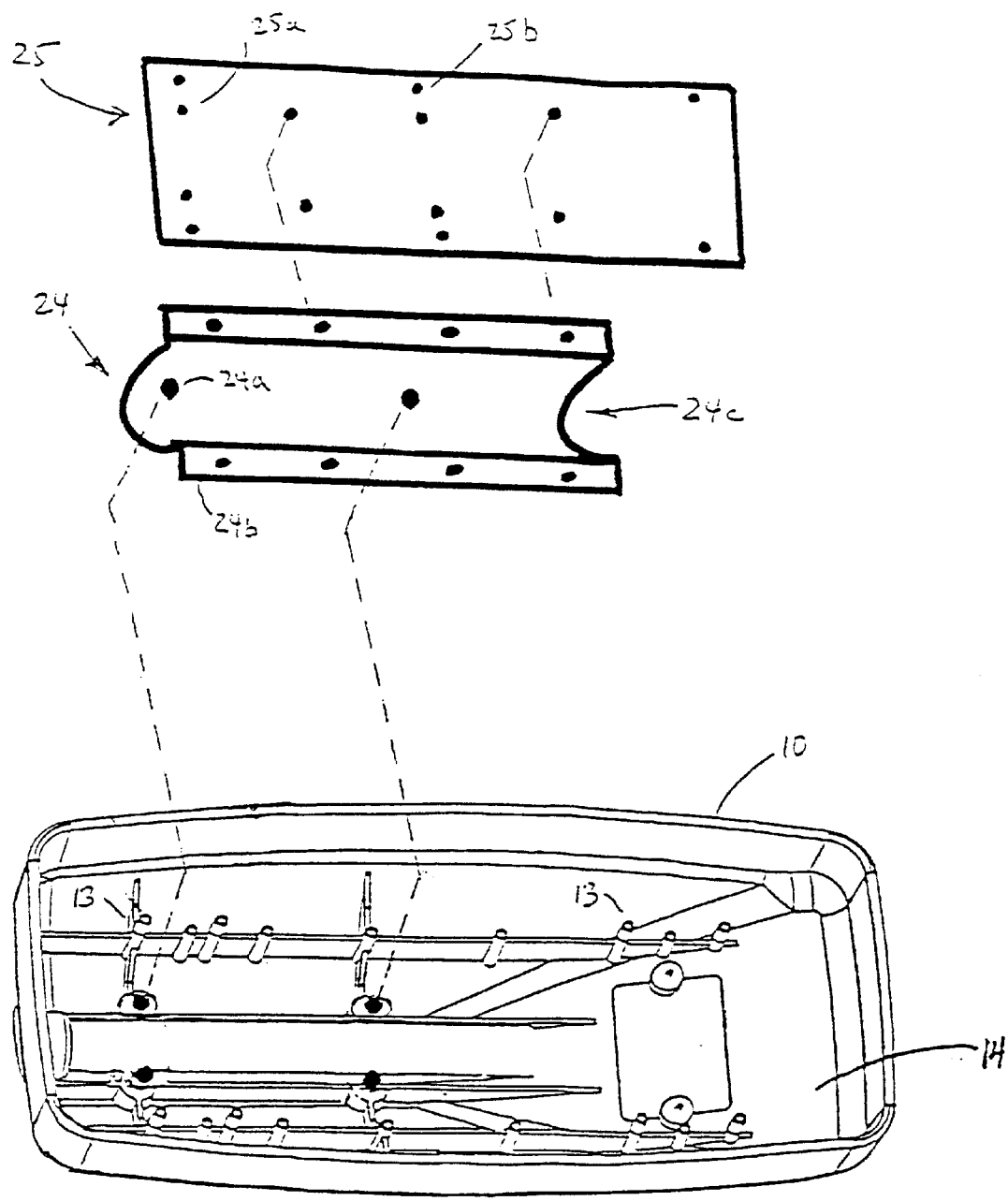
FIG. 14 is a perspective view of the shell housing of the mirror assembly of FIG. 4 which employs a mirror pole mounting plate.

With reference to FIG. 14, the mirror assembly 1 of the present invention may include a mirror pole mounting plate 24 which is operatively coupled to the mirror pole 20 and the shell housing 10. The mirror pole mounting plate 24 includes a longitudinal receiving channel 24c for receiving the mirror pole 20. Bores 24a are positioned through a lower portion of the receiving channel 24c which align with the bores of the shell housing 10 which receive the rear entry bolts 19a (see FIGS. 4 and 4a).

Figure 15A:
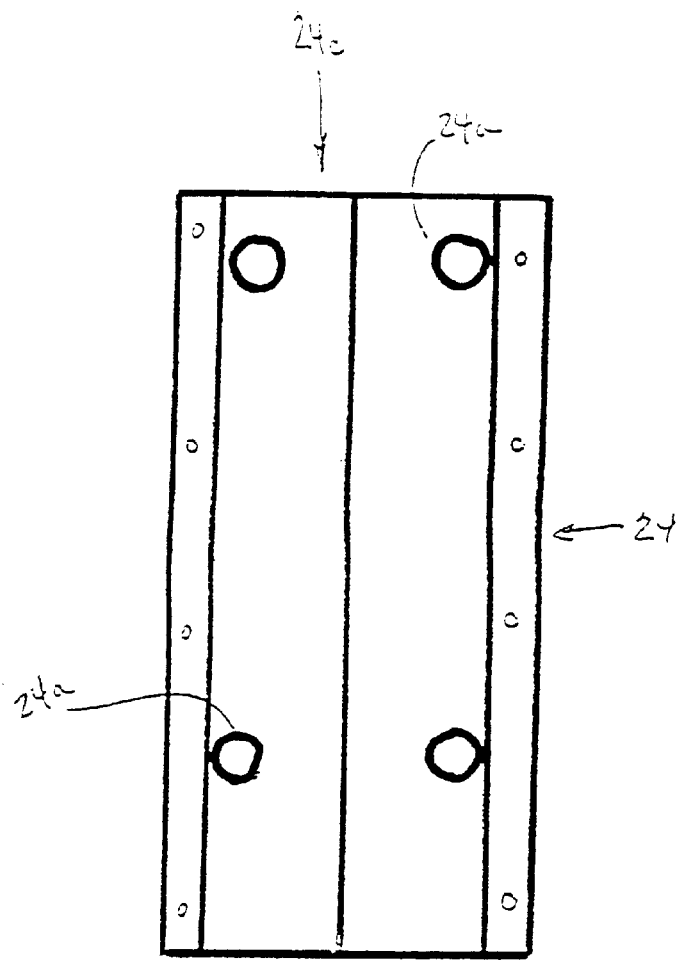
FIG. 15a is a top view of the mirror pole mounting plate of FIG. 14.
Figure 15B:
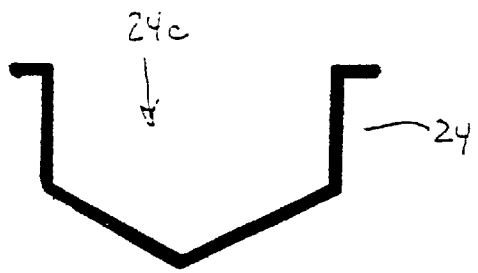

Preferably, the mirror pole mounting plate 24 is formed of a relatively stiff metal material, such as aluminum, non-corrosive steel, or the like. With reference to FIGS. 15a and 15b, the mirror pole mounting plate 24 is preferably formed from sheet metal which is bent (or stamped or extruded) along appropriate axis to form the channel 24c.

The mirror pole mounting plate 24 is positioned within the shell housing 10 and the mirror pole 20 is then slid into the channel 24c. Clamping plates 19 (see FIG. 4) are preferably used to fixedly clamp the mirror pole mounting plate 24 to the mirror pole 20.

An intermediate plate 25 is operatively coupled to the mirror pole mounting plate 24 by way of suitable fastening means, such as bolts or the like. Preferably bores 25a of the intermediate plate 25 are aligned with threaded bores 24b of the mirror pole mounting plate 24 and bolts (not shown) are used to fasten the plates 24, 25 together. It is noted that the intermediate plate 25 may be integral to the mirror pole mounting plate 24 if desired.

The shell housing 10 may also be fastened to the intermediate plate by way of bores 25b which align with long standoffs 13.

The connecting plates 73, 93 (See FIGS. 6–9) of the first and second mirror units 16, 18, respectively, are coupled to the intermediate plate 25 using any of the known methods. Resultantly, the mirror units 16, 18 are directly, rigidly and stiffly coupled to the mirror pole 20 by way of the mirror pole mounting plate 24. This ensures that the mirror units 16, 18 are anchored to as solid a point as possible and that vibrations of the mirror units 16, 18 with respect to the shell housing 10 are eliminated or minimized.

Figure 8:
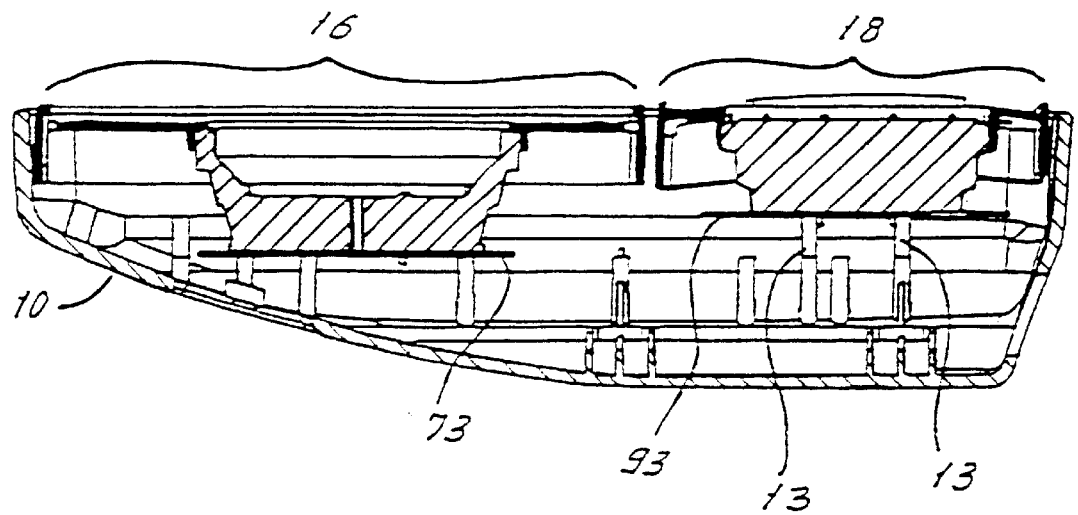
FIG. 8 is a cross-sectional view of the mirror assembly of the present invention.
Figure 9:
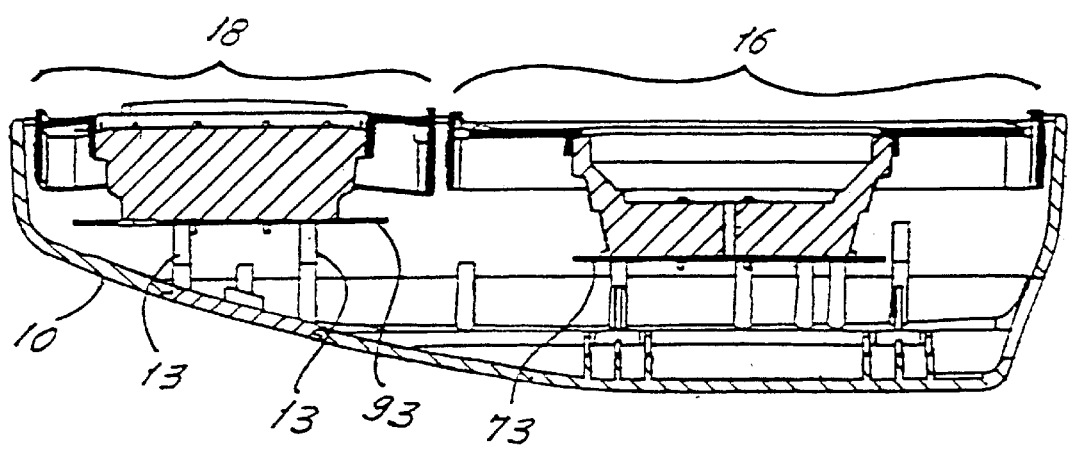
FIG. 9 is a cross-sectional view of the mirror assembly of the present invention.

Reference is now made to FIGS. 8 and 14 in order to compare the embodiment of FIG. 14 (which utilizes the mirror pole mounting plate 24) with the embodiment of FIG. 8 (which couples the mirror pole directly to the shell housing 10).

In the embodiment of FIG. 8 the mirror assemblies 16, 18 are coupled to and supported directly by the shell housing 10. The shell housing 10 is separately coupled to the mirror pole 20. Thus, under some circumstances, undesirable movement (or vibration) may develop between the mirror pole 20 and the mirror assemblies 16, 18. This is in part due to the semi-flexible nature of the shell housing 10, particularly when the shell housing 10 is formed of plastic.

Conversely, in the embodiment of FIG. 14, the mirror assemblies 16, 18 (not shown) are coupled to the mirror pole mounting plate 24, a rigid plate, which is fixedly mounted to the mirror pole 20. Therefore, the shell housing 10 is not directly supporting the mirror assemblies 16, 18, rather, it is the mirror pole 20 which is directly coupled to and supports the mirror assemblies 16, 18 by way of the mirror pole mounting plate 24. It is noted that the mirror pole mounting plate 24 may be formed integral to the mirror pole 20 if desired. Consequently, the mirror assemblies 16, 18 are rigidly anchored to the mirror pole 20 and, therefore, firmly coupled to the frame of the vehicle.

Significant, advantageous and important benefits ensue from the present invention in that it is directly applicable to and mountable on school buses. It is self evident as well as understood that society and government are particularly anxious to provide special safety features for our youngsters during their travels to and from school. School buses are often operated by different drivers and it is imperative that each driver carefully position his/her school bus mirrors to ensure optimal viewing of the movement of both pupils and vehicles in and about the school bus. The present invention aids in achieving that objective in that it allows easy and rapid adjustment of mirrors which plays a significant roll in reducing accidents and protecting our youngsters.

Thus, as described above, due to the telescoping tubes and the hinged pivotal connections provided by means of the bolts 304 and 318, the present invention allows the mirror housing to move when sufficient pressure is applied, by forcing out the dome pin from the through holes, clearing the external and internal tubes and allowing the tubes to slide telescopically relative to one another in a manner which is readily understood from the drawings.

Figure 17:
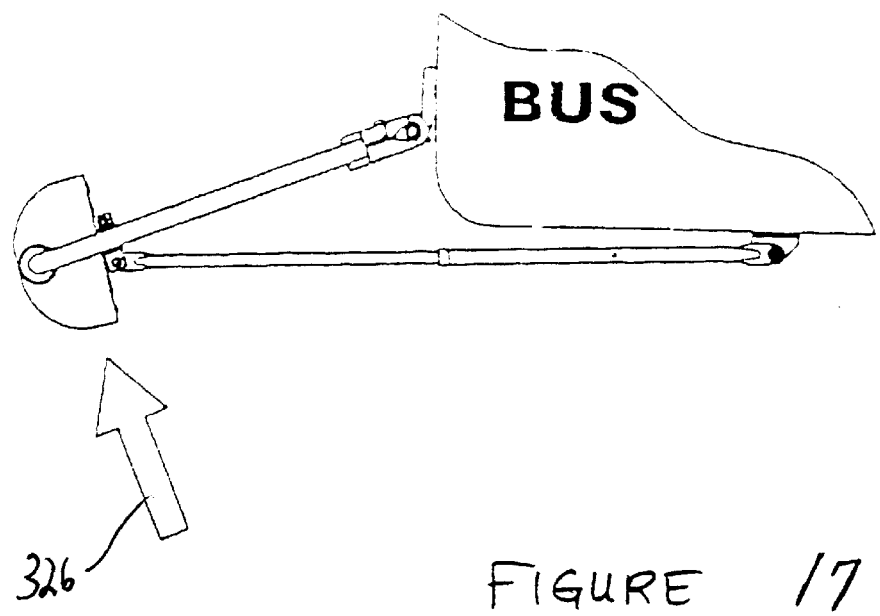
FIG. 17 shows the telescopic support brace extended due to collision with an obstacle.
Figure 18:
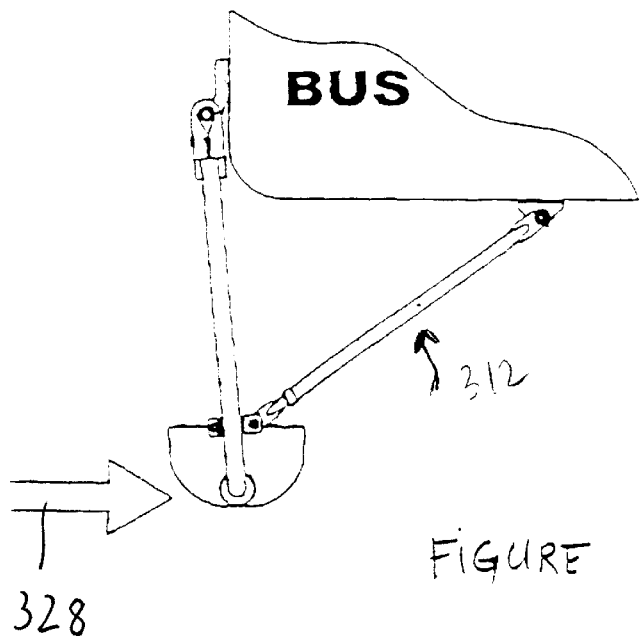
FIG. 18 shows the telescopic support brace collapsed due to collision with an obstacle.
Figure 19:
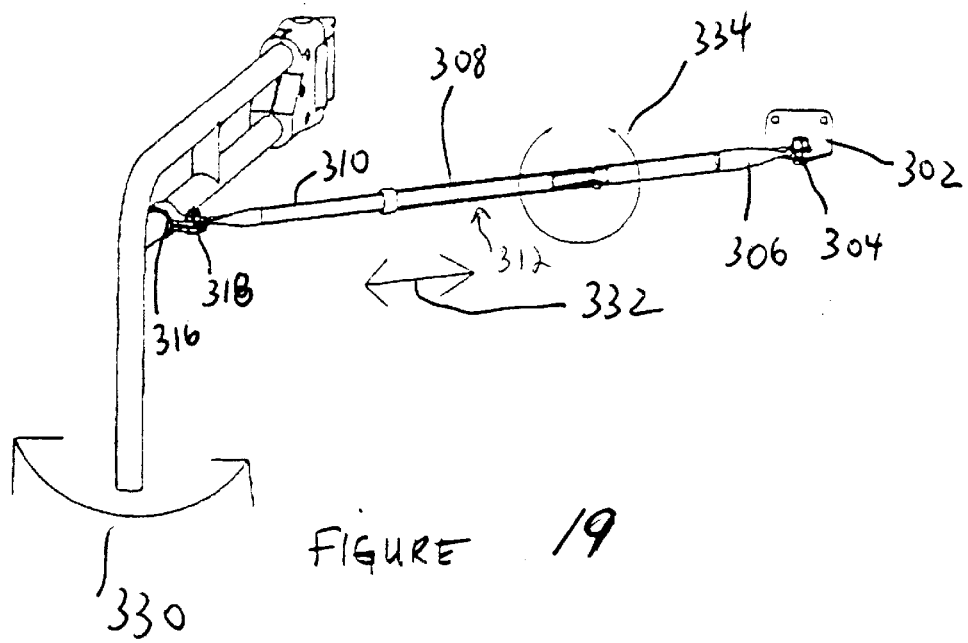
FIG. 19 shows the telescopic support brace in a perspective view that illustrates the swiveling modes of the mirror unit.

With reference to FIGS. 16–20, there is shown a bus body 300 with mounting surface 301 and 303 and with a mirror assembly support structure mounted to the surface 301 in a manner which supports a mirror shell housing 10 described heretofore. These Figures further illustrate a telescopic arm 312 which has one end that is hingedly or pivotally connected to a flange 302 that is connected to the side surface 303 of the bus 300. To this end, as shown in FIG. 19, the telescopic arms has as an end sleeve 306 with a corresponding hole which is aligned with a hole formed in the flange 302 through which a bolt 304 or the like provides a pivotal connection. The telescopic arm has an external tube 308 and an internal tube 310 which slide within one another as further illustrated in FIG. 20. The other end of the telescopic arm 312 is connected by a similar bolt, screw or the like 318 to a sleeve 316 which grips the support structure for the shell housing.

Figure 16:
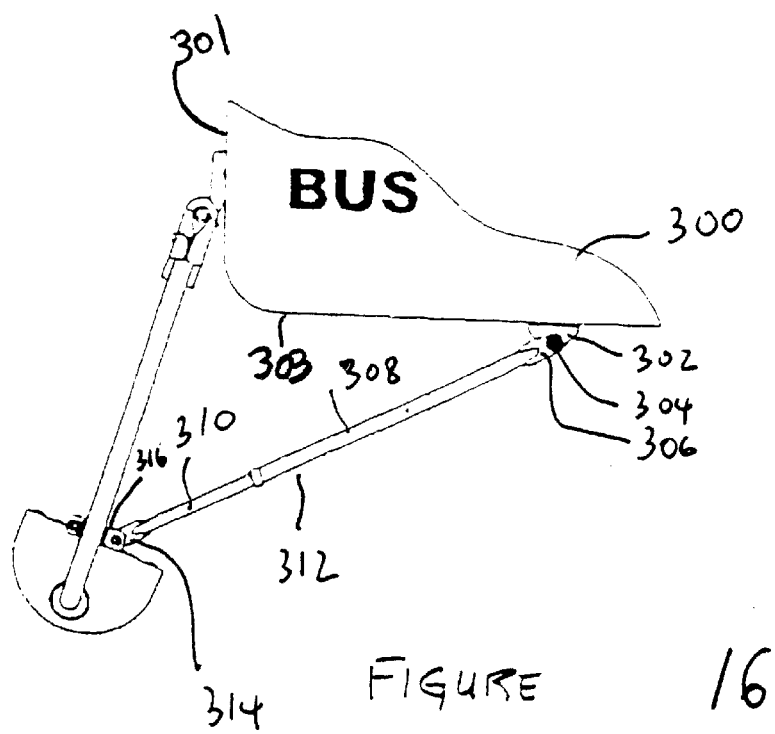
FIG. 16 shows the telescopic support brace of the present invention under normal operating conditions.
Figure 20:
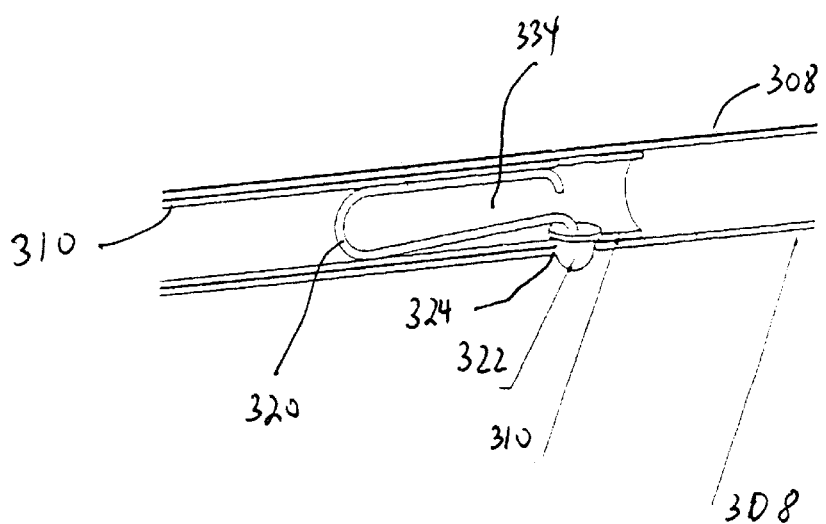
FIG. 20 is a cross section showing a releasable lock mechanism of the telescopic support brace.

With reference to FIG. 20, the external tube 308 and the internal tube 310 are fixed relative to one another by a dome pin 322 which penetrates through openings 324 in the external and internal tubes. A spring wire 320 biases the dome pin 322 in a normal position which releasably locks the external and internal tubes. The normal position of the telescopic support brace 312 is shown in FIG. 16 with the mirror housing positioned for the proper viewing by the bus driver. FIG. 17 shows an arrow 326 which indicates the direction of force when the mirror assembly becomes extended due to a collision with an obstacle. FIG. 18 on the other hand shows the direction of force along arrow 328 which compresses the telescopic support brace 312 as shown.

With further reference to the drawings, FIGS. 16–18 illustrate the mirror assembly support structure and shell housing described in the prior application mounted on a bus and further illustrates a telescopic arm which has one end that is hingedly or pivotably connected to a flange connected to the bus. The other end of the telescopic arm is similarly hingedly connected to the support arm for the shell housing (or the shell housing itself). FIG. 16 shows a normal position of the shell housing, while FIGS. 17 and 18 show an out-of-position orientation of the shell housing due to either a collision or the desire of a bus driver or operator to place the mirror at a different location. In FIG. 17, the telescopic arm is extended to accommodate the movement of the mirror shell housing away from the bus while in FIG. 18 the telescopic arm accommodates movement of the shell housing toward the bus.

FIG. 19 shows the telescopic arm including its connection to the support structure for the shell housing. FIG. 20 is a cross section through the length of a portion of the telescopic arm and shows a spring wire which is mounted to frictionally engage the interior surfaces of the internal tube of the telescopic arm and which includes one end which engages a dome pin that protrudes through a hole that is formed through both the internal and external outer tubes of the telescopic arm. When sufficient pressure is applied, the dome pin will be forced out of the through hole, clearing the internal and external tubes to allow the internal and external tubes to slide telescopically relative to one another in a manner which is readily understood from the drawings.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A vehicular side-view mirror, comprising:

a shell housing;

at least one mirror unit having a first side-view mirror mounted to the shell housing;

a hinge plate member having a portion which is rigidly affixed to a vehicle and another portion which has first and second ends with the first end being hingedly mounted at the hinge plate member and the second portion being pivotally attached to the shell housing in a manner which is capable of holding the shell housing at a distance from the vehicle, and such that the shell housing is swingably mounted relative to the fixed portion of the hinge plate member; and a telescopic support having one end which is attached to the vehicle and another end which is attached to the second portion of the hinge plate member and which is operative to substantially reduce vibrational movements of the shell housing and the at least one mirror unit mounted thereto.

2. The vehicular mirror of claim 1, in which the moveable second portion of the hinge plate member comprises a horizontal portion and a vertical portion and wherein the telescopic arm is connected to the horizontal portion.

3. The vehicular mirror of claim 1, in which the telescopic arm comprises an inner tube, slidable within an outer tube.

4. The vehicular mirror of claim 3, in which the telescopic arm has a pre-determined position of the inner tube and outer tube at which position they are releasably locked to one another by a locking mechanism and the telescopic arm has extended positions and retracted positions.

5. The vehicular mirror of claim 4, in which the locking mechanism comprises through openings in both the inner and outer tubes which are alignable with one another and a resiliently biased pin which is slidable into and out of the openings to lock the inner and outer tubes to one another.

6. The vehicular mirror of claim 5, in which the pin is dome-shaped.

7. The vehicular mirror of claim 2, in which the telescopic support has a first end which is connected to a mounting plate which is attachable to the vehicle and the first end is pivotally connected to the mounting plate, and a second end which is pivotally connected to the horizontal portion of the hinge plate member.

8. The vehicular mirror of claim 6, in which the dome pin is biased by means of a spring wire which is mounted in the inner tube.

9. The vehicular side-view mirror of claim 1, including a housing member engageable with the shell housing.

10. The vehicular side-view mirror of claim 9, wherein the housing member and the hinge plate member comprise a detent for fixing the hinge plate member relative to the housing member in a position of use, the detent exerting a force on the hinge plate member and housing member that resists swingable movement and reduces vibrations in the hinge member when the side-view mirror is in a position of use, the detent permitting swingable movement of the hinge plate member relative to the housing member when sufficient torsional force is exerted on the hinge plate member relative to the housing member.

11. The vehicular side-view mirror of claim 10, wherein the detent comprises:

a piston disposed in the housing member having a channel therein for engaging a detent component;

a spring disposed in the housing member for outwardly pushing the piston and detent component towards the hinge plate member; and an inward detent channel disposed in the hinge plate member for engaging the outwardly pushed detent component.

12. The vehicular side-view mirror of claim 9, wherein the hinge plate is shaped to correspond to a stock plate of the vehicle such that the stock plate may be removed and the hinge plate substituted therefor.

13. The vehicular side-view mirror of claim 9, wherein the hinge plate is fin-shaped to follow the body contour of the vehicle.

14. The vehicular side-view mirror of claim 9, wherein said at least one mirror unit further includes an adjusting unit for permitting manual adjustment of the mirror unit with respect to the shell housing.

* * * * *